C. A. CARLSON.
DEVICE FOR EXPRESSING BLOOD FROM MEAT.
APPLICATION FILED SEPT. 27, 1920.

1,360,882.

Patented Nov. 30, 1920.

INVENTOR
CARL A. CARLSON.

BY
G. H. Braddock
ATTORNEY

UNITED STATES PATENT OFFICE.

CARL A. CARLSON, OF BRIDGEPORT, CONNECTICUT.

DEVICE FOR EXPRESSING BLOOD FROM MEAT.

1,360,882.

Specification of Letters Patent.  Patented Nov. 30, 1920.

Application filed September 27, 1920. Serial No. 413,214.

*To all whom it may concern:*

Be it known that I, CARL A. CARLSON, a subject of the King of Sweden, and resident of Bridgeport, in the county of Fairfield and State of Connecticut, have invented certain new and useful Improvements in Devices for Expressing Blood from Meat, of which the following is a specification.

This invention relates to a novel device for expressing blood from meat, and the object of the invention is to provide an improved device of the present character which shall be extremely simple in construction, cheap to manufacture, and capable of readily and efficiently performing the service for which intended.

With the above and other objects in view, the invention comprises the construction, arrangement and combination of parts as now to be fully described and hereinafter specifically claimed.

In the accompanying drawing forming a part of this specification,

Figure 1:
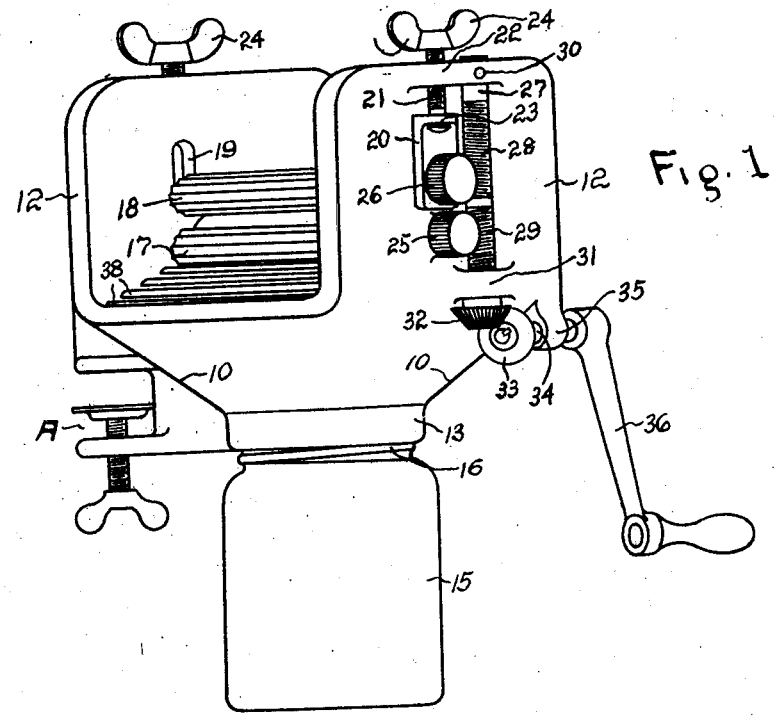
Figure 1 is a perspective view of the device.

The device of this invention consists, broadly, of a casing adapted to carry rolls which are adjustable from and toward each other and which are capable of rotating in opposite directions, and a container adapted to be removably attached to the casing in position to receive blood expressed from meat which has been passed between the rolls.

The casing can be of any desired configuration. I prefer to make it as shown in the drawing and as now to be fully set forth, 10 denotes a continuous conical wall leading to an opening 11, and 12 denotes side walls extending upwardly from the conical wall. The side walls are shown parallel with each other. The portion of the casing which extends below opening 11, denoted by 13, is internally threaded as indicated at 14. 15 denotes a container adapted to receive the expressed blood. The container can be attached to the casing in any desired manner to receive the blood, which, as will be understood, will pass through opening 11. I preferably provide the mouth of the container with a thread 16 adapted to engage thread 14, so that the container can be removably attached in position to receive the blood.

A roll 17 extending across the casing and located above opening 11, is fixedly mounted to turn in the side walls of the casing, and a roll 18 extending across the casing and preferably located above roll 17 is adjustably mounted in said side walls, slots 19 being provided to receive the reduced ends of roll 18 and to allow this roll to be moved from and toward roll 17. 20 denotes adjusting screw brackets which are preferably located at the outer sides of the side walls of the casing and are adapted to rotatably carry the opposite reduced ends of roll 18. Adjusting screws 21, threadably mounted in the upper ends of the side walls, respectively, or in extensions of said side walls, as indicated generally at 22, are adapted to move the adjusting screw brackets to the desired position of roll 18 with respect to roll 17. The connection, denoted 23, between each adjusting screw and its bracket is of such nature that while the adjusting screw can turn in the bracket, these members cannot move longitudinally with respect to each other. Any desired means may be employed for rotating the adjusting screws, as, for example, the finger pieces denoted 24.

25 denotes a gear which is fixed to an end of roll 17 and is located at the outer side of one of the side walls of the casing, and 26 denotes a gear which is fixed to an end of roll 18 and is located at the outer side of one of the adjusting screw brackets. A driving screw 27, provided with right and left hand threads, denoted by 28 and 29, adapted to engage gears 26 and 25, respectively, is rotatably mounted in the casing against longitudinal movement, as suggested at 30 and 31 in Fig. 1, and a beveled gear 32 fixed to the lower end of the driving screw is adapted to mesh with a beveled gear 33 rigidly carried by a shaft 34 mounted in the casing in any desired manner, as at 35. An operating handle 36 is rigidly secured to the shaft.

Figure 2:
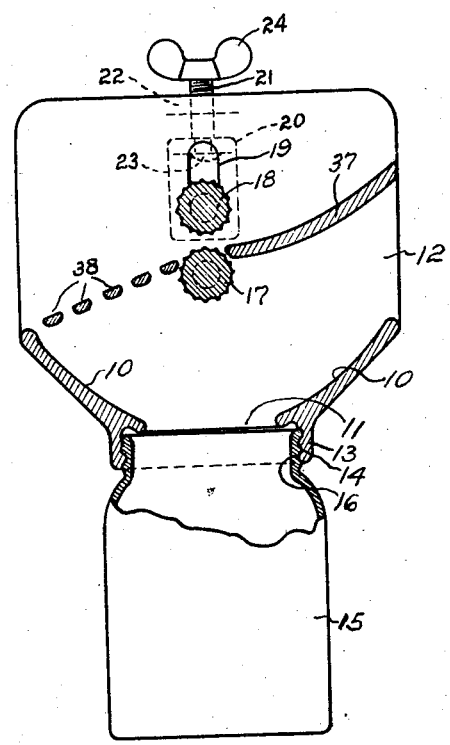
Fig. 2 is a sectional view thereof.

37 denotes a shelf which extends between the side walls of the casing and preferably slants downwardly toward roll 17 about as shown in Fig. 2, and 38 denotes a drain shelf adapted to receive the meat after the blood has been expressed. Either or both of these features can be dispensed with when this is found desirable.

The operation of expressing the blood is extremely simple. After the rolls have been adjusted the desired distance apart, the meat is placed on the shelf and moved to position between the rolls. When now the handle is turned in proper direction the driving screw is rotated and the rolls are caused to turn in opposite directions so that they grip the meat and cause it to be fed through and onto the drain shelf, as will be understood. The pressure of the rolls on the meat expresses the blood which passes through opening 11 into the container. The adjustable roll can be set for meat of any desired thickness, and by the proper adjustment of said roll, any desired pressure can be had on the meat. The rolls can of course have working faces adapted to pierce, mash, or otherwise soften the meat without expressing the blood. As shown, the working faces are serrated. It will be apparent that if found desirable, the rolls and their associated parts can be constructed so that they will be removable from the casing.

At A in Fig. 1 I have indicated a clamp of any desired construction and by means of which the device can be supported from a table, or the like.

While I have shown and described one particular way in which the adjustable rolls and their driving means can be incorporated in the casing to accomplish the objects of the invention, it is to be understood that the construction and arrangement of parts disclosed may be varied within the spirit of the invention and the scope of the claims.

What I desire to claim is:

1. A device for expressing blood from meat, comprising a casing, rolls mounted therein and adapted to be adjusted from and toward each other, gears carried by the rolls, and means whereby the rolls can be rotated in opposite directions, said means including a driving screw adapted to engage said gears.

2. A device for expressing blood from meat, comprising a casing, rolls mounted therein and adapted to be adjusted from and toward each other, gears carried by the rolls, means whereby the rolls can be rotated in opposite directions, said means including a driving screw adapted to engage said gears, and a container located beneath said gears, and detachably connected to said said rolls and detachably connected to said casing.

3. A device for expressing blood from meat, comprising a casing having parallel side walls each provided with a slot, rolls mounted in said side walls, one of said rolls adjustable in said slots from and toward the other roll, and unitary means for causing said rolls to be rotated in opposite directions for the purpose specified.

4. A device for expressing blood from meat, comprising a casing having parallel side walls each provided with a slot, rolls mounted in said side walls, one of said rolls adjustable in said slots from and toward the other roll, said casing further provided with a conical wall leading to an opening, gears carried by said rolls, and a single driving screw adapted to engage said gears to rotate said rolls in opposite directions.

5. A device of the character described, comprising a casing having a continuous wall leading to an opening, rolls mounted in said casing and adapted to be adjusted from and toward each other, and means for causing said rolls to be rotated in opposite directions, said means including gears carried by said rolls and a driving screw meshing with said gears.

6. A device of the character described, comprising a casing having a continuous wall leading to an opening, a container beneath said opening and adapted to be detachably connected to said casing, rolls mounted in said casing and adapted to be adjusted from and toward each other for the purpose specified, and means for rotating said rolls in opposite directions, said means comprising gears carried by said rolls and a driving screw provided with right and left hand threads, one of said threads engaging each of said gears.

7. In a device of the character described, rolls adjustable from and toward each other, gears carried by said rolls, a driving screw provided with right and left threads adapted to engage said gears, respectively, a beveled gear fixed to said driving screw, and means for causing said beveled gear to be rotated.

Signed at Bridgeport, in the county of Fairfield, and State of Connecticut this 25th day of September, A. D. 1920.

CARL A. CARLSON.